2,719,851

PYRROLIDYL-ALKYL ESTERS OF 2,6-DIMETHYL-4-PROPOXYBENZOIC ACIDS

William Bradley Reid, Jr., Kalamazoo, Mich., assignor to The Upjohn Company, Kalamazoo, Mich., a corporation of Michigan No Drawing. Application July 8, 1949,
Serial No. 103,755

9 Claims. (Cl. 260—326.3)

This invention relates to pyrrolidyl-1 and (alkylpyrrolidyl-1)-alkanol esters of 2,6-dimethyl-4-propoxybenzoic acids, and to their acid addition salts.

The esters of this invention are represented by the following structural formula:

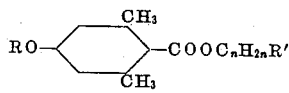

wherein R is a member of the group consisting of normal propyl and isopropyl radicals, R' is a member of the group consisting of pyrrolidyl-1 and lower-alkyl-substituted pyrrolidyl-1 radicals, and $n$ is an integer from 2 to 5, inclusive.

The esters of the invention are high boiling liquids which are readily soluble in most organic solvents but insoluble in water. Their acid addition salts, such as the hydrochloride, hydrobromide, sulfate, nitrate, acetate, and citrate, are generally crystalline solids with well-defined melting points and are readily soluble in cold water, methanol, or ethanol; moderately soluble in isopropanol, ethyl acetate or methyl ethyl ketone; and insoluble in the common aliphatic, cycloaliphatic, and aromatic hydrocarbon solvents.

Members of this new group of compounds have been prepared and found to have value as local anesthetics, being active both subcutaneously and topically.

The free basic esters of the invention can be prepared readily by reacting an acid chloride, having the formula:

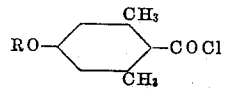

with a pyrrolidyl-alkanol having the formula:

R'C$_n$H$_{2n}$OH wherein R, R' and $n$ have the values previously given. The corresponding acid bromides can also be used, if desired, although the method of preparing the compounds of this invention will be described with particular reference to use of the acid chlorides, which are prepared readily and in excellent yield by treating the corresponding acid with thionyl chloride for a period of from one to several hours. The reaction can be carried out conveniently at the reflux temperature of the mixture. An excess of thionyl chloride is usually employed and the excess subsequently removed by distillation at a reduced pressure, leaving the acid chloride as a residue which is usually sufficiently pure for use without further purification, but which can be fractionally distilled for purification, if desired. Acid bromides are prepared from the acids in a similar fashion using thionyl bromide.

The acids used in the form of their bromides or chlorides in preparing the esters of the invention, can be synthesized by the following procedure: bromination of 3,5-dimethylphenol to produce 4-bromo-3,5-dimethylphenol, etherification to produce a 4-bromo-3,5-dimethylphenyl propyl ether, reaction with magnesium to form a Grignard complex, carbonation, and acidification. Each of these steps is known and can be performed as described in the prior art, and as further described in the examples.

The pyrrolidyl alkanols used in preparing the esters of the invention may be prepared conveniently in several ways. For examples, a haloalkanol may be reacted with pyrrolidine or with an alkyl pyrrolidine. In certain instances, it is advantageous first to condense pyrrolidine or an alkylpyrrolidine with a suitable halo-ketone, an ester of a suitable saturated haloaliphatic acid, or an ester of a suitable alpha,beta-unsaturated aliphatic acid, to form a pyrrolidyl ketone or an ester of a pyrrolidyl aliphatic acid. In other instances, it may be of advantage to condense a suitable amino alcohol with succinic acid to form an N-hydroxyalkyl succinimide, or with a gamma-keto acid to form an N-hydroxyalkylpyrrolidone. These ketones or esters are then allowed to react with lithium aluminum hydride in absolute ether to produce the desired pyrrolidyl alkanol or alkyl-pyrrolidyl alkanol. Pyrrolidyl alkanols also may be prepared by condensing a selected pyrrolidone compound with formaldehyde and a suitable aliphatic aldehyde to produce an N-pyrrolidylaldehyde, which is readily reduced with aluminum isopropoxide in isopropyl alcohol to the desired pyrrolidyl alkanol or alkylpyrrolidyl alkanol.

The reaction of an acid chloride and a pyrrolidyl alkanol can be carried out conveniently by mixing the two substances together in the presence of an inert diluent, such as dry xylene or other hydrocarbon, or in the absence of such diluent. Reaction usually occurs at ordinary temperatures and can be accelerated and brought substantially to completion by finally refluxing the mixture for about thirty minutes or longer. Upon allowing the reaction mixture to cool, the hydrochloride of the basic ester generally crystallizes and can be separated from any inert diluent by filtration. The free ester can be recovered and purified by dissolving the crude hydrochloride in water, extracting the solution with ether to remove any remaining inert diluent or other water-insoluble substances, alkalizing the solution with aqueous sodium hydroxide, extracting with ether or other suitable organic liquid, and eventually distilling the extract to volatilize the solvent. The basic esters can be distilled under reduced pressure to obtain a higher degree of purity, if desired, or the salts can be purified by recrystallization from a suitable solvent, such as alcohol, ethyl acetate, methyl ethyl ketone, or the like.

Acid addition salts of the basic esters, such as the hydrochloride, hydrobromide, sulfate, phosphate, acetate, citrate, tartrate, benzoate, lactate, picrate, and other acid addition salts can be easily prepared by allowing the ester to react with a selected acid in a solvent such as alcohol or a mixture of alcohol and ethyl acetate. Upon distillation of the solvent, the salt remains as a residue, which can be purified by recrystallization from alcohol, methyl ethyl ketone, ethyl acetate, or other suitable solvent. A mixture of ethyl acetate and acetone is particularly suitable in certain instances. Acid addition salts with certain inorganic acids, especially with hydrochloric acid, have well-defined crystalline structures. Certain of the polybasic acids, such as citric acid, combine with the amino esters in equimolar proportions to form the monoamine salts.

The pyrrolidyl-alkanol used in preparing the esters of the invention can be a pyrrolidyl-ethanol, a pyrrolidyl-propanol, a pyrrolidyl-butanol, or a pyrrolidyl-pentanol. The carbon chain of the alkylene group, $C_nH_{2n}$, can be straight or branched. The pyrrolidine ring can be unsubstituted or it can contain one or more lower-alkyl groups.

"Lower-alkyl" as used in this specification and the appended claims, includes alkyl groups having one to five carbon atoms, inclusive. Representative groups which may be substituted on the pyrrolidyl ring are, for example, methyl, ethyl, propyl, isopropyl, butyl, secondary-butyl, tertiary-butyl, pentyl, isopentyl, and the like.

It is to be understood that the invention is not limited to alkyl-pyrrolidyl esters wherein the pyrrolidyl ring contains a single lower-alkyl substituent, but that the pyrrolidyl ring may contain a plurality of such substituents. The pyrrolidyl ring is in all cases attached to the alkylene group through the nitrogen atom.

Representative pyrrolidyl-alkanols, which, among others, can be used in preparing esters of the invention, include:

2-(pyrrolidyl-1)ethanol
2-(2-methylpyrrolidyl-1)-ethanol
2-(3-methylpyrrolidyl-1)-ethanol
2-(2,3-dimethylpyrrolidyl-1)-ethanol
2-(2,4-dimethylpyrrolidyl-1)-ethanol
2-(2,5-dimethylpyrrolidyl-1)-ethanol
2-(3,3-dimethylpyrrolidyl-1)-ethanol
2-(3,4-dimethylpyrrolidyl-1)-ethanol
2-(2,4,4-trimethylpyrrolidyl-1)-ethanol
2-(2-ethylpyrrolidyl-1)-ethanol
2-(2-pentylpyrrolidyl-1)-ethanol
2-[2-(n-propyl)pyrrolidyl-1]-ethanol
2-(pyrrolidyl-1)-propanol-1
3-(pyrrolidyl-1)-propanol-1
2-methyl-2-(pyrrolidyl-1)-propanol-1
3-(2-methylpyrrolidyl-1)-propanol-1
2-methyl-3-(pyrrolidyl-1)-propanol-1
2,2-dimethyl-3-(pyrrolidyl-1)-propanol-1
1-(pyrrolidyl-1)-propanol-2
1-(2,4-dimethylpyrrolidyl-1)-propanol-2
1-(2,5-dimethylpyrrolidyl-1)-propanol-2
3-(pyrrolidyl-1)-butanol-1
4-(pyrrolidyl-1)-butanol-1
3-(pyrrolidyl-1)-butanol-2
1-(pyrrolidyl-1)-butanol-3
1-(pyrrolidyl-1)-pentanol-4

Although the preferred method of preparing the compounds of the invention comprises reacting a 2,6-dimethyl-4-propoxy-benzoyl chloride with a pyrrolidyl alkanol, because of the high yield of pure product obtained, it should be pointed out that the esters may also be prepared in other ways apparent to those familiar with the art. Thus, for example, an alkali metal salt of a 2,6-dimethyl-4-pyropoxybenzoic acid can be heated with a suitable pyrrolidyl-alkyl halide, preferably in a suitable solvent such as ethanol, isopropanol, isopropyl ether, or butanol, and the desired ester isolated from the reaction mixture.

Free basic esters within the scope of the invention include, among others:

2-(pyrrolidyl-1)-ethyl 2,6-dimethyl-4-(n-propoxy)benzoate
2-(pyrrolidyl-1)-ethyl 2,6-dimethyl-4-isopropoxybenzoate
2-(3-methylpyrrolidyl-1)-ethyl 2,6-dimethyl-4-(n-propoxy)benzoate
2-(3-methylpyrrolidyl-1)-ethyl 2,6-dimethyl-4-isopropoxybenzoate
2-(2,3-dimethylpyrrolidyl-1)-ethyl 2,6-dimethyl-4-(n-propoxy)benzoate
2-(2,3-dimethylpyrrolidyl-1)-ethyl 2,6-dimethyl-4-isopropoxybenzoate
2-(2-methylpyrrolidyl-1)-ethyl 2,6-dimethyl-4-(n-propoxy)benzoate
2-(2-methylpyrrolidyl-1)-ethyl 2,6-dimethyl-4-isopropoxybenzoate
2-(2,4-dimethylpyrrolidyl-1)-ethyl 2,6-dimethyl-4-(n-propoxy)benzoate
2-(2,4-dimethylpyrrolidyl-1)-ethyl 2,6-dimethyl-4-isopropoxybenzoate
2-(2,5-dimethylpyrrolidyl-1)-ethyl 2,6-dimethyl-4-(n-propoxy)benzoate
2-(2,5-dimethylpyrrolidyl-1)-ethyl 2,6-dimethyl-4-isopropoxybenzoate
2-(3,3-dimethylpyrrolidyl-1)-ethyl 2,6-dimethyl-4-(n-propoxy)benzoate
2-(3,3-dimethylpyrrolidyl-1)-ethyl 2,6-dimethyl-4-isopropoxybenzoate
2-(3,4-dimethylpyrrolidyl-1)-ethyl 2,6-dimethyl-4-(n-propoxy)benzoate.
2-(3,4-dimethylpyrrolidyl-1)-ethyl 2,6-dimethyl-4-isopropoxybenzoate
2-(2,4,4-trimethylpyrrolidyl-1)-ethyl 2,6-dimethyl-4-(n-propoxy)benzoate
2-(2,4,4-trimethylpyrrolidyl-1)-ethyl 2,6-dimethyl-4-isopropoxybenzoate
2-(2-ethylpyrrolidyl-1)-ethyl 2,6-dimethyl-4-(n-propoxy)-benzoate
2-(2-ethylpyrrolidyl-1)-ethyl 2,6-dimethyl-4-isopropoxybenzoate
2 - (pyrrolidyl - 1) - 1 - propyl 2,6 - dimethyl - 4 - (n-propoxy)benzoate
2 - (pyrrolidyl - 1) - 1 - propyl 2,6 - dimethyl - 4 - isopropoxybenzoate
3 - (pyrrolidyl - 1) - 1 - propyl 2,6 - dimethyl - 4 - (n-propoxy)benzoate
3 - (pyrrolidyl - 1) - 1 - propyl 2,6 - dimethyl - 4 - isopropoxybenzoate
2 - methyl - 2 - (pyrrolidyl - 1) - 1 - propyl 2,6 - dimethyl-4-(n-propoxy)benzoate
2 - methyl - 2 - (pyrrolidyl - 1) - 1 - propyl 2,6 - dimethyl-4-isopropoxybenzoate
3 - (2 - methylpyrrolidyl - 1) - 1 - propyl 2,6 - dimethyl-4-(n-propoxy)benzoate
3 - (2 - methylpyrrolidyl - 1) - 1 - propyl 2,6 - dimethyl-4-isopropoxybenzoate
2 - methyl - 3 - (pyrrolidyl - 1) - 1 - propyl 2,6 - dimethyl-4-(n-propoxy)benzoate
2 - methyl - 3 - (pyrrolidyl - 1) - 1 - propyl 2,6 - dimethyl-4-isopropoxybenzoate
2,2 - dimethyl - 3 - (pyrrolidyl - 1) - 1 - propyl 2,6-dimethyl-4-(n-propoxy)benzoate
2,2 - dimethyl - 3 - (pyrrolidyl - 1) - 1 - propyl 2,6 - dimethyl-4-isopropoxybenzoate
1 - (pyrrolidyl - 1) - 2 - propyl 2,6 - dimethyl - 4 - (n-propoxy)benzoate
1 - (pyrrolidyl - 1) - 2 - propyl 2,6 - dimethyl - 4 - isopropoxybenzoate
1 - (2,4 - dimethylpyrrolidyl - 1) - 2 - propyl 2,6 - dimethyl-4-(n-propoxy)benzoate
1 - (2,4 - dimethylpyrrolidyl - 1) - 2 - propyl 2,6 - dimethyl-4-isopropoxybenzoate
1 - (2,5 - dimethylpyrrolidyl - 1) - 2 - propyl 2,6 - dimethyl-4-isopropoxybenzoate
1 - (2,5 - dimethylpyrrolidyl - 1) - 2 - propyl 2,6 - dimethyl-4-(n-propyl)benzoate
3 - (pyrrolidyl - 1) - 1 - butyl 2,6 - dimethyl - 4 - (n-propoxy)benzoate
3 - (pyrrolidyl - 1) - 1 - butyl 2,6 - dimethyl - 4 - isopropoxybenzoate
4 - (pyrrolidyl - 1) - 1 - butyl 2,6 - dimethyl - 4 - (n-propoxy)benzoate
4 - (pyrrolidyl - 1) - 1 - butyl 2,6 - dimethyl - 4 - isopropoxybenzoate
3 - (pyrrolidyl - 1) - 2 - butyl 2,6 - dimethyl - 4 - (n-propoxy)benzoate
3 - (pyrrolidyl - 1) - 2 - butyl 2,6 - dimethyl - 4 - isopropoxybenzoate
1 - (pyrrolidyl - 1) - 3 - butyl 2,6 - dimethyl - 4 - (n-propoxy)benzoate
1 - (pyrrolidyl - 1) - 3 - butyl 2,6 - dimethyl - 4 - isopropoxybenzoate
1 - (pyrrolidyl - 1) - 4 - pentyl 2,6 - dimethyl - 4 - (n-propoxy)benzoate
1 - (pyrrolidyl - 1) - 4 - pentyl 2,6 - dimethyl - 4 - isopropoxybenzoate The following preparations and examples are given to illustrate certain methods by which some of the starting materials and compounds of the present invention can be prepared, but are not to be construed as limiting.

PREPARATION 1.—ETHYL ALPHA-(PYRROLIDYL-1)-PROPIONATE

To a stirred solution of 181 grams of ethyl alpha-bromopropionate in 200 milliliters of benzene, 148 grams of pyrrolidine was added at a substantially uniform rate over a period of 45 minutes. The reaction was quite vigorous, causing the solvent to boil. After all of the pyrrolidine had been added, the solution was heated under reflux for an hour, cooled, poured into 400 milliliters of ice-water, acidified with dilute aqueous hydrochloric acid, and the resulting two layers separated. The aqueous layer was washed with ether, made strongly alkaline with cold aqueous sodium hydroxide, and extracted four times with 200 milliliter portions of either. The ether extracts were combined, dried, the solvent removed, and the residue distilled at a reduced pressure of about 12 millimeters of mercury absolute. There was thus obtained 156.7 grams (91.5 percent of the theoretical) of ethyl alpha-(pyrrolidyl-1)-propionate, boiling at 84 degrees centigrade at a pressure of 12 millimeters of mercury absolute.

PREPARATION 2.—2-(PYRROLIDYL-1)-PROPANOL-1

To a mixture of 7.6 grams of lithium aluminum hydride in 250 milliliters of dry ether, 61.7 grams of ethyl alpha-(pyrrolidyl-1)-propionate was added slowly, causing gentle refluxing of the ether. The mixture was then allowed to stand for a few minutes without cooling, 20 milliliters of water added dropwise and the mixture then cooled to about ten degrees centigrade by adding ice. After acidifying with aqueous hydrochloric acid, the aqueous layer was separated, washed with ether, and made strongly basic with concentrated aqueous sodium hydroxide. The basic solution was then extracted repeatedly with ether, ether extracts combined, dried with anhydrous potassium carbonate, the ether removed, and the residual oil fractionally distilled. There was thus obtained 38.1 grams of 2-(pyrrolidyl-1)-propanol-1, boiling at 80 degrees centigrade at a pressure of 11 millimeters of mercury absolute, and having an index of refraction, $n_D^{25}$, of 1.4758.

PREPARATION 3

Following substantially the procedure given in Preparations 1 and 2, the following alcohols were prepared:

1. 2-methyl-3-(pyrrolidyl-1)-propanol-1, boiling at 91 degrees centigrade at a pressure of 12 millimeters of mercury absolute; $n_D^{25}$, of 1.4620.
2. 3-(pyrrolidyl-1)-butanol-1, boiling at 114 degrees centigrade at a pressure of 21 millimeters of mercury absolute; $n_D^{25}$, of 1.4742.
3. 3-(pyrrolidyl-1)-butanol-2, boiling at 79 degrees centigrade at a pressure of 13 millimeters of mercury absolute; $n_D^{25}$, of 1.4610.
4. 1-(pyrrolidyl-1)-butanol-3, boiling at 87 degrees centigrade at a pressure of 15 millimeters of mercury absolute; $n_D^{25}$, of 1.4611.

PREPARATION 4.—3-(PYRROLIDYL-1)-PROPANOL-1

A mixture consisting of 50.7 grams of sodium hydroxide, 45.7 grams of water, and 60.5 grams of pyrrolidine, was prepared, stirred vigorously, and 100 grams of 3-chloropropanol-1 added thereto at a rate such that the temperature was maintained between about 75 and 100 degrees centigrade. When addition had been completed, the mixture was stirred for an additional thirty minutes and allowed to stand for several hours. Sufficient solid sodium hydroxide was then added to saturate the mixture, and resulting oily layer separated. The aqueous layer was extracted with benzene, the benzene extract added to the oily layer, and the mixture fractionally distilled. There was thus obtained 65.5 grams of 3-(pyrrolidyl-1)-propanol-1, boiling at 115 degrees centigrade at a pressure of 43 millimeters of mercury absolute, and having an index of refraction, $n_D^{25}$, of 1.4701.

PREPARATION 5.—4-(PYRROLIDYL-1)-BUTANOL-1

Following substantially the procedure given in Preparation 4, 4-(pyrrolidyl-1)-butanol-1, having a boiling point of 113 degrees centigrade under a pressure of 12 millimeters of mercury absolute; $n_D^{25}$, of 1.4705, was prepared.

PREPARATION 6.—2-METHYL-2-(PYRROLIDYL-1)-PROPANOL-1

A mixture of 44.6 grams of 2-amino-2-methyl-propanol-1, 108 grams of tetramethylene dibromide, and 200 milliliters of toluene was refluxed for three hours, 84 grams of sodium bicarbonate added, and the refluxing continued for an additional fifteen hours. The mixture was then cooled to about 25 degrees centigrade, 80 milliliters of aqueous fifty percent sodium hydroxide added, the resulting organic layer removed, sufficient water added to dissolve the salt, and the aqueous solution extracted continuously with ether for nine hours. The ether extract and the organic layer were combined, dried over anhydrous potassium carbonate and distilled. The distillate, melting at 27.5 degrees centigrade, was dissolved in dilute acid and treated with aqueous sodium nitrite to remove any secondary amines. After extracting with ether, the aqueous solution was made basic with aqueous sodium hydroxide and extracted three times with 100-milliliter portions of ether. The ether extracts were combined, dried, the ether removed and the residue distilled under a reduced pressure of about 12 millimeters of mercury absolute. There was thus obtained 54 grams (75.5 percent of the theoretical) of 2-methyl-2-(pyrrolidyl-1)-propanol-1, boiling at 87 degrees centigrade under a pressure of 12 millimeters of mercury absolute, and having an index of refraction, $n_D^{30}$, of 1.4720.

PREPARATION 7.—2,2-DIMETHYL-3-(PYRROLIDYL-1)-PROPIONALDEHYDE

A mixture of 71.1 grams of pyrrolidine, 81 milliliters of concentrated hydrochloric acid, and 81 milliliters of 37 percent formalin was heated to reflux, 79.3 grams of isobutyraldehyde added at a substantially uniform rate over a period of three quarters of an hour, boiling under reflux continued for an additional hour, 50 milliliters of 37 percent formalin added, and the mixture refluxed for another hour and a quarter. After standing for three days, the mixture was made strongly basic with 40 percent sodium hydroxide and extracted five times with 100-milliliter portions of ether. The ether extracts were combined, dried over anhydrous potassium carbonate, solvent removed, and the residue fractionally distilled at a reduced pressure of about 32 millimeters of mercury absolute. There was thus obtained 65.7 grams (42.3 percent of the theoretical) of 2,2-dimethyl-3-(pyrrolidyl-1)-propionaldehyde, boiling at 97 degrees centigrade at a pressure of 32 millimeters of mercury absolute, and having an index of refraction, $n_D^{25}$, of 1.456.

PREPARATION 8.—2,2-DIMETHYL-3-(PYRROLIDYL-1)-PROPANOL-1

A mixture of 61.5 grams of 2,2-dimethyl-3-(pyrrolidyl-1)-propionaldehyde and 350 milliliters of isopropanol was removed from 40.8 grams of aluminum isopropoxide by slow distillation through an efficient column. After six hours of distillation, the distillate gave a negative test for acetone. The dark residue was then cooled and 200 milliliters of 10 percent sodium hydroxide added. The organic layer was separated from the aqueous layer, and saturated with aqueous potassium carbonate to form two layers. The aqueous fraction was separated, combined with the aqueous layer obtained previously, and extracted six times with 100-milliliter portions of ether. The ether extracts were combined and dried over anhydrous potassium carbonate. The ether was removed and the residue fractionally distilled at a reduced pressure of about 26 millimeters of mercury absolute. There was thus obtained 25.6 grams (41.7 percent of the theoretical) of 2,2-dimethyl-3-(pyrrolidyl-1)-propanol-1, boiling at 111 degrees centigrade at a pressure of 26 millimeters of mercury absolute, and having an index of refraction, $n_D^{25}$, of 1.4609.

PREPARATION 9.—1-(PYRROLIDYL-1)-PENTANONE-4

A solution of 150 grams of 2-(pyrrolidyl-1)-ethyl chloride in 100 milliliters of benzene was added dropwise to a suspension of the sodium enolate of ethyl acetoacetate (obtained from 147 grams of ethyl acetoacetate and 26 grams of metallic sodium) in one liter of boiling benzene, and the mixture heated under reflux for ten hours. The mixture was cooled to about 25 degrees centigrade, and a solution of 75 milliliters of concentrated sulfuric acid in 160 milliliters of water and 140 grams of ice added thereto. The resulting aqueous layer was separated and washed with benzene. The aqueous acidic solution of ethyl alpha-[beta'-(pyrrolidyl-1)-ethyl]-acetoacetate sulfate was heated under reflux for seventeen hours, cooled to about 20 degrees centigrade, 430 milliliters of cold thirty percent sodium hydroxide solution added, and the resulting oily organic layer separated. The aqueous layer was extracted three times with 100-milliliter portions of benzene, the organic layer and the benzene extracts combined, dried, the benzene removed, and the residue distilled at a reduced pressure of about 12 millimeters of mercury absolute. There was thus obtained 129 grams of 1-(pyrrolidyl-1)-pentanone-4, distilling at 92–98 degrees centigrade at 11–13 millimeters of mercury pressure absolute. Redistillation gave 98.2 grams of 1-(pyrrolidyl-1)-pentanone-4 ($n_D^{25}$ of 1.4589), distilling at 93–95 degrees centigrade at a pressure of 11 millimeters of mercury absolute.

PREPARATION 10.—1-(PYRROLIDYL-1)-PENTANOL-4

A solution of 65.5 grams of 1-(pyrrolidyl-1)-pentanone-4 in 60 milliliters of methanol was hydrogenated at 1100 pounds pressure and 100 degrees centigrade in the presence of five grams of Raney nickel catalyst. The reaction took about three hours to absorb nearly the theoretical quantity of hydrogen. After removal of the catalyst and solvent, the residue was distilled under a reduced pressure of about 12 millimeters of mercury. There was thus obtained 57.2 grams (85 percent of the theoretical) of 1-(pyrrolidyl-1)-pentanol-4, boiling at 111 degrees centigrade at a pressure of 12 millimeters of mercury absolute, and having an index of refraction, $n_D^{25}$, of 1.4652.

PREPARATION 11.—1-(2-HYDROXYETHYL)-5-METHYL-PYRROLIDONE-2

A suspension of 0.2 gram of platinum oxide catalyst in 25 milliliters of absolute ethanol was reduced to platinum, a solution of 34.8 grams of levulinic acid and 37.8 grams of ethanolamine in 75 milliliters of absolute alcohol added, and the mixture hydrogenated at about 50 pounds pressure and room temperature for about four hours, at the end of which time the theoretical amount of hydrogen had been absorbed. After the catalyst and solvent had been removed, the residue was fractionally distilled. There was thus obtained 42.5 grams (100 percent of the theoretical) of 1-(2-hydroxyethyl)-5-methyl-pyrrolidone-2, boiling at 167 degrees centigrade at a pressure of 12 millimeters of mercury absolute and having an index of refraction, $n_D^{20}$, of 1.4900.

PREPARATION 12.—2-(2-METHYLPYRROLIDYL-1)-ETHANOL

By a procedure similar to that described in Preparation 2, fifty-one grams of 1-(2-hydroxyethyl)-5-methyl-2-pyrrolidone was reduced with 18 grams of lithium aluminum hydride in 400 milliliters of ether. Distillation gave 35 grams (76 percent of the theoretical) of 2-(2-methylpyrrolidyl-1)-ethanol, boiling at 87 degrees centigrade at a pressure of 16 millimeters of mercury absolute, and having an index of refraction, $n_D^{25}$, of 1.4680.

PREPARATION 13

By a procedure similar to that described in Preparations 11 and 12, the following compounds were prepared:

1. 2-(2,3-dimethylpyrrolidyl-1)-ethanol, boiling at 86 degrees centigrade at a pressure of 13 millimeters of mercury absolute, index of refraction, $n_D^{25}$, of 1.4661.
2. 3-(2-methylpyrrolidyl-1)-propanol-1, boiling at 100 degrees centigrade at a pressure of 18 millimeters of mercury absolute, index of refraction, $n_D^{25}$, of 1.4672.

PREPARATION 14.—N-(2-HYDROXYETHYL)-ALPHA-METHYLSUCCINIMIDE

A mixture of 66 grams of alpha-methyl-succinic acid and 73.4 grams of monoethanolamine was heated by means of an oil bath, the temperature of the mixture gradually rising to 260 degrees centigrade, until distillation ceased. The residue was distilled under a reduced pressure of about one millimeter of mercury to obtain a viscous oil which, upon fractional distillation, yielded 67.8 grams (86.4 percent of the theoretical) of N-(2-hydroxyethyl)-alpha-methylsuccinimide, boiling at 102 degrees centigrade at a pressure of 0.01 millimeter of mercury absolute and having an index of refraction, $n_D^{25}$, of 1.4970.

PREPARATION 15.—2-(3-METHYLPYRROLIDYL)-ETHANOL

By a procedure similar to that described in Preparation 2, 62.8 grams of N-(2-hydroxyethyl)-alpha-methylsuccinimide was reduced with 30 grams of lithium aluminum hydride. Upon fractional distillation, there was obtained 35 grams (68.1 percent of the theoretical) of 2-(3-methylpyrrolidyl)-ethanol, boiling at 86 degrees centigrade at a pressure of 16 millimeters of mercury absolute, and having a refraction index, $n_D^{25}$, of 1.4680.

PREPARATION 16

By a procedure similar to that described in Preparations 14 and 15, the following alcohols were prepared:

1. 2-(3,3-dimethylpyrrolidyl-1)-ethanol, boiling at 81 degrees centigrade at a pressure of 13 millimeters of mercury absolute, index of refraction, $n_D^{25}$, of 1.4580.
2. 2-(3,4-dimethylpyrrolidyl-1)-ethanol, boiling at 86 degrees centigrade at a pressure of 12 millimeters of mercury absolute, index of refraction, $n_D^{25}$, of 1.4594.
3. 2-(2,4,4-trimethylpyrrolidyl-1)-ethanol, boiling at 84 degrees centigrade at a pressure of 14 millimeters of mercury absolute, index of refraction, $n_D^{25}$, of 1.4535.

PREPARATION 17.—4-BROMO-3,5-DIMETHYL-PHENOL

A solution of 160 grams of bromine, dissolved in 700 milliliters of glacial acetic acid, was added, with stirring, at a substantially uniform rate over a period of two hours to 122 grams of meta xylenol dissolved in 600 milliliters of glacial acetic acid maintained at 17–20 degrees centigrade. The reaction mixture was then poured into a mixture of two kilograms of 50 percent sodium hydroxide solution and 15 kilograms of crushed ice. The solid which separated was filtered off, dried, and recrystallized from n-pentane. There was thus obtained 115 grams of 4-bromo-3,5-dimethyl-phenol, melting at 112–114 degrees centigrade.

PREPARATION 18.—2,6-DIMETHYL-4-(N-PROPOXY)-BROMOBENZENE

To a solution of 55.2 grams of sodium metal, dissolved in 800 milliliters of absolute n-propanol, was added 482.6 grams of 4-bromo-3,5-dimethyl-phenol, followed by 615.0 grams of n-propyl bromide. The mixture was heated under reflux for five hours, excess n-propylbenzene and n-propyl alcohol removed by distillation, and the sodium bromide filtered off. The filter cake was washed with ether, the ether extract combined with the filtrate, dried, the solvent removed by distillation, and the sodium bromide filtered off. The filter cake was washed with ether, the ether extract combined with the filtrate, dried, the solvent removed by distillation, and the residue distilled under a reduced pressure. There was thus obtained 441.9 grams of 2,6-dimethyl-4-(n-propoxy)-bromobenzene, distilling at 81 degrees centigrade at a pressure of 0.15 millimeter of mercury absolute, and having an index of refraction, $n_D^{25}$, of 1.5440.

Analysis:
  Calculated for $C_{11}H_{15}OBr$: Br, 32.8
  Found: 32.7

PREPARATION 19.—2,6-DIMETHYL-4-(N-PROPOXY)-BENZOIC ACID

To a mixture of 46.2 grams of magnesium turnings and one liter of absolute diethyl ether was added, with stirring, over a period of five hours, 439.2 grams of 2,6-dimethyl-4-(n-propoxy)bromobenzene dissolved in 750 milliliters of anhydrous diethyl ether. After the reaction was complete, as shown by disappearance of the magnesium, the reaction mixture was cooled, poured onto about one kilogram of finely divided solid carbon dioxide and allowed to stand overnight. The resulting solid mass was decomposed with an excess of dilute hydrochloric acid, the ether layer separated and extracted with ten percent sodium hydroxide solution. The alkaline extract was acidified and the resulting solid filtered, dried, and recrystallized from a mixture of hexane and pentane. There was thus obtained 255.2 grams of 2,6-dimethyl-4-(n-propoxy)-benzoic acid, melting at 90 to 91 degrees centigrade.

Analysis:
  Calculated for $C_{12}H_{16}O_3$: C, 69.3; H, 7.75
  Found: 69.4; 7.40

PREPARATION 20.—2,6-DIMETHYL-4-(N-PROPOXY)-BENZOYL CHLORIDE

A mixture of 328 grams of thionyl chloride, 255 grams of 2,6-dimethyl-4-(n-propoxy)benzoic acid, and 150 milliliters of benzene was heated under anhydrous reflux for 18 hours, concentrated under reduced pressure to remove the excess of thionyl chloride and benzene, and the residue distilled. There was thus obtained 205 grams of 2,6-dimethyl-4-(n-propoxy)-benzoyl chloride, boiling at 131 to 132 degrees centigrade at a pressure of 12 millimeters of mercury absolute.

PREPARATION 21.—2,6-DIMETHYL-4-ISOPROPOXYBROMOBENZENE

In a manner essentially that described in Preparation 18, 471 grams of 2,6-dimethyl-4-isopropoxybromobenzene, boiling at 131 to 132 degrees centigrade at a pressure of 11 millimeters of mercury absolute, was obtained from 482.6 grams of 4-bromo-3,5-dimethylphenol, 55.2 grams of sodium, and 492 grams of isopropyl bromide in 1.5 liters of anhydrous isopropanol.

Analysis:
  Calculated for $C_{11}H_{15}OBr$: Br, 32.8
  Found: 32.7

PREPARATION 22.—2,6-DIMETHYL-4-ISOPROPOXYBENZOIC ACID

In a manner essentially that described in Preparation 19, 260 grams of 2,6-dimethyl-4-isopropoxybenzoic acid, melting at 121 to 122 degrees centigrade, was obtained from 404.4 grams of 2,6-dimethyl-4-isopropoxybromobenzene, 41.3 grams of magnesium metal, 1.75 liters of absolute ethyl ether, and one kilogram of powdered solid carbon dioxide.

PREPARATION 23.—2,6-DIMETHYL-4-ISOPROPOXYBENZOYL CHLORIDE

In a manner essentially that described in Preparation 20, 204.2 grams of 2,6-dimethyl-4-isopropoxybenzoyl chloride, boiling at 141 to 142 degrees centigrade at a pressure of ten millimeters of mercury absolute, was obtained from 255 grams of 2,6-dimethyl-4-isopropoxybenzoic acid, 328 grams of thionyl chloride, and 150 milliliters of benzene.

Example 1.—2-(3,3-dimethylpyrrolidyl-1)-ethyl 2,6-dimethyl-4-(n-propoxy)-benzoate.

A solution of 7.9 grams of 2-(3,3-dimethylpyrrolidyl-1)-ethanol in 25 milliliters of dry methyl ethyl ketone was added to a solution of 11.4 grams of 2,6-dimethyl-4-(n-propoxy)benzoyl chloride in 25 milliliters of dry methyl ethyl ketone. The resulting solution was heated under reflux for four hours, and cooled to about room temperature. The crude hydrochloride was filtered off, dissolved in water, the solution made alkaline with aqueous sodium hydroxide and extracted three times with 50-milliliter portions of ether. The organic extracts were combined, dried, the solvent removed by distillation, and the residue distilled at a reduced pressure. There was thus obtained 10.6 grams of 2-(3,3-dimethylpyrrolidyl-1)-ethyl 2,6-dimethyl-4-(n-propoxy)benzoate, boiling at 142–143 degrees centigrade at a pressure of 0.03 millimeter of mercury absolute.

Analysis:
  Calculated for $C_{20}H_{31}O_3N$: N, 4.20
  Found: 4.38

Example 2.—2-(3,3-dimethylpyrrolidyl-1)-ethyl 2,6-dimethyl-4-(n-propoxy)-benzoate hydrochloride A slight excess of dry hydrogen chloride gas was added to five grams of 2-(3,3-dimethylpyrrolidyl-1)-ethyl 2,6-dimethyl-4-(n-propoxy)benzoate in 50 milliliters of dry ethyl ether. The ether was decanted and the oily precipitate crystallized from ethyl acetate. There was thus obtained 4.7 grams of 2-(3,3-dimethylpyrrolidyl-1)-ethyl 2,6-dimethyl-4-(n-propoxy)benzoate hydrochloride, melting at 175 to 176.5 degrees centigrade.

Analysis:
  Calculated for $C_{20}H_{32}O_3NCl$: Cl, 9.58
  Found: 9.64

Example 3

In a manner essentially that described in Examples 1 and 2, the following esters and their hydrochlorides were prepared:

1. 2-(pyrrolidyl-1)-ethyl 2,6-dimethyl-4-(n-propoxy)-benzoate, boiling at 135 to 135.5 degrees centigrade at a pressure of 0.95 millimeter of mercury absolute, $n_D^{23}$, 1.5208.

Analysis:
  Calculated for $C_{18}H_{27}NO_3$: N, 4.58
  Found: 4.58

The hydrochloride melted at 148.5 to 151 degrees centigrade.

Analysis:
  Calculated for $C_{18}H_{28}NO_3Cl$: N, 4.46
  Found: 4.77

2. 2-(pyrrolidyl-1)-ethyl 2,6-dimethyl-4-isopropoxybenzoate, boiling at 131 degrees centigrade at a pressure of 0.03 millimeter of mercury absolute, $n_D^{21}$, 1.5208.

Analysis:
  Calculated for $C_{18}H_{27}NO_3$: N, 4.58
  Found: 4.82

The hydrochloride melted at 166 to 167 degrees centigrade.

Analysis:
  Calculated for $C_{18}H_{28}NO_3Cl$: Cl, 10.4
  Found: 10.5

3. 2-(3-methylpyrrolidyl-1)-ethyl 2,6-dimethyl-4-(n-propoxy)-benzoate, boiling at 154.5 to 155 degrees centigrade at a pressure of 0.07 millimeter of mercury absolute, $n_D^{20}$, 1.5162.

Analysis:
Calculated for $C_{19}H_{29}NO_3$: N, 4.38
Found: 4.52

The hydrochloride melted at 133 to 134 degrees centigrade.

Analysis:
Calculated for $C_{19}H_{30}NO_3Cl$: Cl, 9.96
Found: 10.0

4. 2-(3-methylpyrrolidyl-1)-ethyl 2,6-dimethyl-isopropoxy-benzoate, boiling at 141–142 degrees centigrade at a pressure of 0.03 millimeter of mercury absolute, $n_D^{26}$, 1.5130.

Analysis:
Calculated for $C_{19}H_{29}NO_3$: N, 4.38
Found: 4.47

The hydrochloride melted at 148 to 149 degrees centigrade.

Analysis:
Calculated for $C_{19}H_{30}NO_3Cl$: Cl, 9.96
Found: 9.86

5. 2-(2-methylpyrrolidyl-1)-ethyl 2,6-dimethyl-4-(n-propoxy)benzoate, boiling at 163.5 to 164 degrees centigrade at a pressure of 0.05 millimeter of mercury absolute, $n_D^{23}$, 1.5162.

Analysis:
Calculated for $C_{19}H_{29}NO_3$: N, 4.38
Found: 4.56

The hydrochloride melted at 163 to 164 degrees centigrade.

Analysis:
Calculated for $C_{19}H_{30}NO_3Cl$: Cl, 9.96
Found: 10.1

6. 2-(2-methylpyrrolidyl-1)-ethyl 2,6-dimethyl-4-isopropoxybenzoate, boiling at 143 degrees centigrade at a pressure of 0.03 millimeter of mercury absolute, $n_D^{21}$, 1.5163.

Analysis:
Calculated for $C_{19}H_{29}NO_3$: N, 4.38
Found: 4.48

The hydrochloride melted at 180 to 187.5 degrees centigrade.

Analysis:
Calculated for $C_{19}H_{30}NO_3Cl$: Cl, 9.96
Found: 10.0

7. 2-(3,3-dimethylpyrrolidyl-1)-ethyl 2,6-dimethyl-4-isopropoxybenzoate, boiling at 154 to 155 degrees centigrade at a pressure of 0.4 millimeter of mercury absolute, $n_D^{24}$, 1.5058.

Analysis:
Calculated for $C_{20}H_{31}NO_3$: N, 4.20
Found: 4.17

The hydrochloride melted at 204 to 206 degrees centigrade.

Analysis:
Calculated for $C_{20}H_{32}NO_3Cl$: Cl, 9.58
Found: 9.33

8. 2-(2,5-dimethylpyrrolidyl-1)-ethyl 2,6-dimethyl-4-(n-propoxy)benzoate, boiling at 159.5 to 160 degrees centigrade at a pressure of 0.05 millimeter of mercury absolute, $n_D^{25}$, 1.5121.

Analysis:
Calculated for $C_{20}H_{31}NO_3$: N, 4.20
Found: 4.44

The hydrochloride melted at 185 to 186 degrees centigrade.

Analysis:
Calculated for $C_{20}H_{32}NO_3Cl$: Cl, 9.58
Found: 9.38

9. 2-(2,5-dimethylpyrrolidyl-1)-ethyl 2,6-dimethyl-4-isopropoxybenzoate, boiling at 142 to 143 degrees centigrade at a pressure of 0.03 millimeter of mercury absolute, $n_D^{23}$, 1.5113.

Analysis:
Calculated for $C_{20}H_{31}NO_3$: N, 4.20
Found: 4.15

The hydrochloride melted at 202 to 204 degrees centigrade.

Analysis:
Calculated for $C_{20}H_{32}NO_3Cl$: Cl, 9.58
Found: 9.61

10. 2-(pyrrolidyl-1)-1-propyl 2,6-dimethyl-4-(n-propoxy)benzoate, boiling at 166 degrees centigrade at a pressure of 0.04 millimeter of mercury absolute, $n_D^{25}$, 1.5192.

Analysis:
Calculated for $C_{19}H_{29}NO_3$: N, 4.38
Found: 4.36

The hydrochloride melted at 149–150.5 degrees centigrade.

Analysis:
Calculated for $C_{19}H_{30}NO_3Cl$: Cl, 9.96
Found: 10.0

11. 2-(pyrrolidyl-1)-1-propyl 2,6-dimethyl-4-isopropoxybenzoate, boiling at 143 to 144 degrees centigrade at a pressure of 0.05 millimeter of mercury absolute, $n_D^{27}$, 1.5180.

Analysis:
Calculated for $C_{19}H_{29}NO_3$: N, 4.38
Found: 4.42

The hydrochloride melted at 174 to 175 degrees centigrade.

Analysis:
Calculated for $C_{19}H_{30}NO_3Cl$: Cl, 9.96
Found: 9.74

12. 1-(pyrrolidyl-1)-2-propyl 2,6-dimethyl-4-(n-propoxy)benzoate, boiling at 132 degrees centigrade at a pressure of 0.05 millimeter of mercury absolute, $n_D^{25}$, 1.5135.

Analysis:
Calculated for $C_{19}H_{29}NO_3$: N, 4.38
Found: 4.20

The hydrochloride melted at 178 to 179 degrees centigrade.

Analysis:
Calculated for $C_{19}H_{30}NO_3Cl$: Cl, 9.96
Found: 9.96

13. 1-(pyrrolidyl-1)-2-propyl 2,6-dimethyl-4-isopropoxybenzoate, boiling at 139 to 140 degrees centigrade at a pressure of 0.05 millimeter of mercury absolute, $n_D^{23}$, 1.5147.

Analysis:
Calculated for $C_{19}H_{29}NO_3$: N, 4.38
Found: 4.36

The hydrochloride melted at 194 to 197 degrees centigrade.

Analysis:
Calculated for $C_{19}H_{30}NO_3Cl$: Cl, 9.96
Found: 9.92

14. 3-(pyrrolidyl-1)-2-butyl 2,6-dimethyl-4-(n-propoxy)benzoate, boiling at 143 to 144 degrees centigrade at a pressure of 0.03 millimeter of mercury absolute, $n_D^{21}$, 1.5179.

Analysis:
Calculated for $C_{20}H_{31}NO_3$: N, 4.20
Found: 4.07

The hydrochloride melted at 182 to 183 degrees centigrade.

Analysis:
Calculated for $C_{20}H_{32}NO_3Cl$: Cl, 9.58
Found: 9.45

15. 3 - (pyrrolidyl - 1)-2-butyl 2,6-dimethyl-4-isopropoxybenzoate, boiling at 155 to 156 degrees centigrade at a pressure of 0.07 millimeter of mercury absolute, $n_D^{23}$, 1.5162.

Analysis:
Calculated for $C_{20}H_{31}NO_3$: N, 4.20
Found: 4.36

The hydrochloride melted at 134 to 140 degrees centigrade.
Analysis:
Calculated for $C_{20}H_{32}NO_3Cl$: Cl, 9.58
Found: 9.59

16. 2-methyl-2-(pyrrolidyl-1)-1-propyl 2,6-dimethyl-4-(n-propoxy)benzoate, boiling at 142.5 to 143.5 degrees centigrade at a pressure of 0.03 millimeter of mercury absolute, $n_D^{25}$, 1.5190.

Analysis:
Calculated for $C_{20}H_{31}NO_3$: N, 4.20
Found: 4.13

The hydrochloride melted at 175 to 176 degrees centigrade.

Analysis:
Calculated for $C_{20}H_{32}NO_3Cl$: Cl, 9.58
Found: 9.61

17. 2-methyl-2-(pyrrolidyl-1)-1-propyl 2,6-dimethyl-4-isopropoxybenzoate, boiling at 144 to 145 degrees centigrade at a pressure of 0.03 millimeter of mercury absolute.

Analysis:
Calculated for $C_{20}H_{31}NO_3$: N, 4.20
Found: 4.04

The hydrochloride melted at 199 to 201 degrees centigrade.

Analysis:
Calculated for $C_{20}H_{32}NO_3Cl$: Cl, 9.58
Found: 9.66

18. 3 - (pyrrolidyl - 1)-1-propyl 2,6-dimethyl-4-(n-propoxy)benzoate, boiling at 151.5 to 152 degrees centigrade at a pressure of 0.07 millimeter of mercury absolute, $n_D^{25}$, 1.5176.

Analysis:
Calculated for $C_{19}H_{29}NO_3$: N, 4.38
Found: 4.40

The hydrochloride melted at 150.5 to 152 degrees centigrade.

Analysis:
Calculated for $C_{19}H_{30}NO_3Cl$: Cl, 9.96
Found: 9.86

19. 3 - (pyrrolidyl - 1) - 1-propyl 2,6-dimethyl-4-isopropoxybenzoate, boiling at 146 to 147 degrees centigrade at a pressure of 0.03 millimeter of mercury absolute, $n_D^{27}$, 1.5157.

Analysis:
Calculated for $C_{19}H_{29}NO_3$: N, 4.38
Found: 4.44

The hydrochloride melted at 162 to 163 degrees centigrade.

Analysis:
Calculated for $C_{19}H_{30}NO_3Cl$: Cl, 9.96
Found: 9.90

20. 3 - (pyrrolidyl - 1) - 1 - butyl 2,6-dimethyl-4-(n-propoxy)benzoate, boiling at 149 to 150 degrees centigrade at a pressure of 0.04 millimeter of mercury absolute, $n_D^{12}$, 1.5189.

Analysis:
Calculated for $C_{20}H_{31}NO_3$: N, 4.20
Found: 4.18

The hydrochloride melted at 115 to 116 degrees centigrade.

Analysis:
Calculated for $C_{20}H_{32}NO_3Cl$: Cl, 9.58
Found: 9.69

21. 3 - (pyrrolidyl - 1) - 1-butyl 2,6-dimethyl-4-isopropoxybenzoate, boiling at 146 to 147 degrees centigrade at a pressure of 0.03 millimeter of mercury absolute, $n_D^{21}$, 1.5181.

Analysis:
Calculated for $C_{20}H_{31}NO_3$: N, 4.20
Found: 4.18

The hydrochloride melted at 111.5 to 112.5 degrees centigrade.

Analysis:
Calculated for $C_{20}H_{32}NO_3Cl$: Cl, 9.58
Found: 9.53

22. 2-methyl-3-(pyrrolidyl-1)-1-propyl 2,6-dimethyl-4-(n-propoxy)benzoate, boiling at 140 to 141 degrees centigrade at a pressure of 0.04 millimeter of mercury absolute, $n_D^{26}$, 1.5144.

Analysis:
Calculated for $C_{20}H_{31}NO_3$: N, 4.20
Found: 4.25

The hydrochloride melted at 131 to 132 degrees centigrade.

Analysis:
Calculated for $C_{20}H_{32}NO_3Cl$: Cl, 9.58
Found: 9.67

23. 2-methyl-3-(pyrrolidyl-1)-1-propyl 2,6-dimethyl-4-isopropoxybenzoate, boiling at 153 to 154 degrees centigrade at a pressure of 0.05 millimeter of mercury absolute, $n_D^{21}$, 1.5155.

Analysis:
Calculated for $C_{20}H_{31}NO_3$: N, 4.20
Found: 4.08

The hydrochloride melted at 156 to 157 degrees centigrade.

Analysis:
Calculated for $C_{20}H_{32}NO_3Cl$: Cl, 9.58
Found: 9.61

24. 3 - (2-methylpyrrolidyl-1)-1-propyl 2,6-dimethyl-4-(n-propoxy)benzoate, boiling at 145 to 146 degrees centigrade at a pressure of 0.02 millimeter of mercury absolute, $n_D^{20}$, 1.5165.

Analysis:
Calculated for $C_{20}H_{31}NO_3$: N, 4.20
Found: 4.23

The hydrochloride melted at 178 to 179 degrees centigrade.

Analysis:
Calculated for $C_{20}H_{32}NO_3Cl$: Cl, 9.58
Found: 9.64

25. 3 - (2-methylpyrrolidyl-1)-1-propyl 2,6-dimethyl-4-isopropoxybenzoate, boiling at 164 to 165 degrees centigrade at a pressure of 0.1 millimeter of mercury absolute, $n_D^{20}$,1.5145.

Analysis:
Calculated for $C_{20}H_{31}NO_3$: N, 4.20
Found: 4.33

The hydrochloride melted at 191.5 to 193 degrees centigrade.

Analysis:
Calculated for $C_{20}H_{32}NO_3Cl$: Cl, 9.58
Found: 9.42

26. 4 - (pyrrolidyl - 1) - 1-butyl 2,6-dimethyl-4-(n-propoxy)benzoate hydrochloride, melting at 103 to 104 degrees centigrade.

Analysis:
Calculated for $C_{20}H_{32}NO_3Cl$: Cl, 9.58
Found: 9.77

27. 4 - (pyrrolidyl - 1) - 1-butyl 2,6-dimethyl-4-isopropoxybenzoate hydrochloride, melting at 110.5 to 112 degrees centigrade.

Analysis:
Calculated for $C_{20}H_{32}NO_3Cl$: Cl, 9.58
Found: 9.61

The compounds mentioned in the foregoing include certain species within the scope of this invention, but modifications of the said compounds will be apparent to those skilled in the art. Thus, it is to be understood that the present invention is limited only as defined in the appended claims.

I claim:
1. A compound selected from the group consisting of (a) compounds represented by the formula:

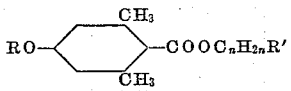

wherein R is a propyl group, R' is a member of the group consisting of pyrrolidyl-1 and lower-alkyl-substituted pyrrolidyl-1, n is an integer from 2 to 5, inclusive; and (b) acid addition salts thereof with acids.

2. A compound represented by the formula:

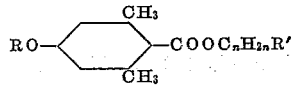

wherein R is a propyl group, R' is pyrrolidyl-1, and n is an integer from 2 to 5, inclusive.

3. An acid addition salt of a compound represented by the formula:

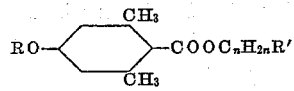

wherein R is a propyl group, R' is pyrrolidyl-1, and n is an integer from 2 to 5, inclusive.

4. 1 - (Pyrrolidyl - 1)-2-propyl 2,6-dimethyl-4-(n-propoxy)benzoate.

5. 2 - (Pyrrolidyl - 1)-1-propyl 2,6-dimethyl-4-(n-propoxy)benzoate.

6. 2 - Methyl-2-(pyrrolidyl-1)-1-propyl 2,6-dimethyl-4-(n-propoxy)benzoate.

7. 3 - (Pyrrolidyl - 1) - 2-butyl 2,6-dimethyl-4-(n-propoxy)benzoate.

8. 4 - (Pyrrolidyl - 1) - 1-butyl 2,6-dimethyl-4-(n-propoxy)benzoate hydrochloride.

9. A compound represented by the formula:

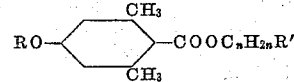

wherein R is a propyl group, R' is a lower-alkyl-substituted pyrrolidyl-1, and n is an integer from 2 to 5, inclusive.

References Cited in the file of this patent
UNITED STATES PATENTS 2,081,712   Rohmann _____ May 25, 1937
2,605,266   Reid _____ July 29, 1951

OTHER REFERENCES

Blicke et al.: Jr. Am. Chem. Soc., vol. 53 (March 1931), pp. 1015–25.

Moore: Jr. Am. Pharm. Assoc., vol. 33 (July 1944), Scientific Edition, pp. 193–204.